No. 869,175. PATENTED OCT. 22, 1907.
P. GORUT.
TOOTHPICK.
APPLICATION FILED APR. 3, 1907.
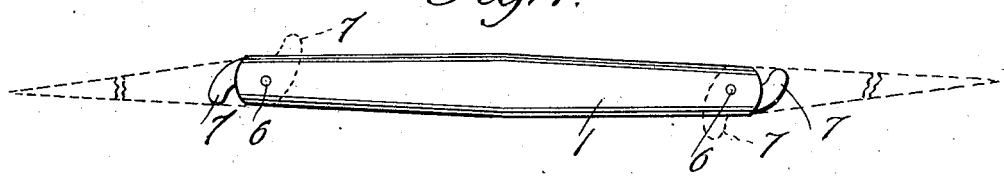
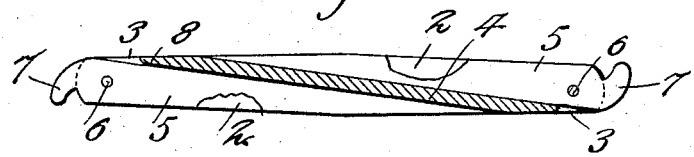
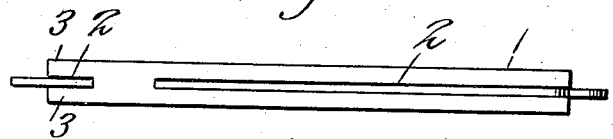
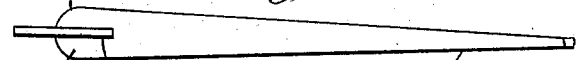
Inventor
Peter Gorut,
Witnesses
By Victor J. Evans
Attorney

UNITED STATES PATENT OFFICE.

PETER GORUT, OF FULTON CHAIN, NEW YORK.

TOOTHPICK.

No. 869,175.   Specification of Letters Patent.   Patented Oct. 22, 1907.

Application filed April 3, 1907. Serial No. 366,202.

*To all whom it may concern:*

Be it known that I, PETER GORUT, a citizen of the United States, residing at Fulton Chain, in the county of Herkimer and State of New York, have invented new and useful Improvements in Toothpicks, of which the following is a specification.

This invention relates to that class of toothpicks which comprise a blade or blades pivoted upon a suitable handle.

One particular object of the invention is to improve the construction of the handle to prevent foreign and objectionable substances from finding lodgment therein.

A further object of the invention is to improve the construction of the blade forming the toothpick by providing the same with an extension whereby it may be readily moved to open or closed position, and it will also serve, by engagement with the handle, to maintain the blade in an open position while in use.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the claims may be resorted to when desired.

In the drawing, Figure 1 is a side elevation showing one form of the improved toothpick. Fig. 2 is a longitudinal sectional view of the same. Fig. 3 is a top plan view. Fig. 4 is a side view illustrating a slightly modified form. Fig. 5 is a top view of the latter. Fig. 6 is a longitudinal sectional view of the device shown in Figs. 4 and 5.

Corresponding parts in the several figures are denoted by like characters of reference.

The device illustrated in Figs. 1, 2 and 3 differs from that shown in Figs. 4, 5 and 6 principally in that it shows a handle provided with two blades constituting toothpicks, while in Figs. 4, 5 and 6 is shown a handle of a somewhat different design and having a single blade.

In the several figures of the drawing 1 designates a handle which consists of a solid, integral elongated piece of material such as bone, ivory, hard rubber, celluloid or the like. Said handle, as shown in Figs. 1, 2 and 3, is provided with oppositely disposed incisions or kerfs forming recesses 2—2, each of which extends from one end of the handle in the direction of the opposite end; the extremities of the handle being longitudinally divided by said kerfs so as to present ears 3—3, the bottoms of said kerfs being inclined in opposite directions so that the said kerfs will be separated by an inclined or obliquely disposed web 4. The blades 5—5 which are pivotally supported by means of pins 6—6 extending transversely through the ears 3 at the ends of the handle, are made tapering shape to fit the kerfs or recesses of the handle; said blades being preferably composed of thin sheets of hard rubber, celluloid or other suitable material or substance; said blades are provided adjacent to the pivot ends or butt ends with lugs or projections 7 of curved or arcuate shape that extend beyond the ends of the handle so that by pressing against or manipulating said lugs, the blades may be turned upon their pivots so as to project them from the kerfs or recesses within which they are normally concealed from view and protected.

In the construction illustrated in Figs. 4, 5 and 6, the handle is provided with but a single kerf or recess 2 extending from one end of the handle in the direction of the opposite end thereof, one end of said handle being divided by said kerf to form the ears 3—3 between which the blade 5 is pivoted upon a pin 6 in precisely the manner which has been hereinbefore described; said blade being provided with a projection or lug 7 whereby it may be manipulated.

The handle, in any case, may be of any suitable ornamental shape; the handle illustrated in Figs. 4, 5 and 6 is made to represent the outline of a fish, but the design thereof may obviously be varied to any extent.

The blade receiving kerf in the handle is made of such dimensions that the blade, when folded, will completely fill the kerf, and prevent foreign and objectionable substances from entering thereinto; it follows that, when the blade is folded into the kerf or recess, it is wiped or stripped of any material that may adhere thereto, and it will thus be kept in a sanitary condition, perfectly clean and ready for use. While the blade is thus made to fit tightly in the kerf or recess, it may be readily manipulated or projected for use by means of the lug 7; and, when the blade is unfolded the said lug will rest and bear against the solid portion of the handle adjacent to the ears 3—3 where shoulder, 8, is formed which constitutes an obstruction that will prevent the blade from swinging beyond a desired point.

Having thus fully described the invention, what I claim as new is:—

1. A handle member consisting of an integral piece of material having an incision or kerf extending from one end in the direction of the opposite end of said member, and dividing the end of the handle member from which it extends to form spaced ears, in combination with a blade pivoted between said ears, said blade being of dimensions to accurately fit and completely fill the kerf or recess whereby, when said blade is folded within the recess, adhering material will be wiped therefrom.

2. A handle member consisting of an integral piece of material having an incision or kerf extending from one end in the direction of the opposite end thereof and dividing the end of the handle to form spaced ears, in combination with a blade pivoted between said ears and provided at its butt end with a lug or extension of arcuate shape extending beyond the handle when the blade is folded and adapted to engage the shoulder or solid portion of the handle adjacent to the spaced ears when the blade is extended, said blade being of dimensions to accurately fit and completely fill the kerf or recess whereby, when the blade is folded within the recess, adhering material will be wiped therefrom.

3. A handle provided with kerfs extending from each end in the direction of the opposite end, said kerfs serving to divide the ends of the handle to form spaced ears, and said kerfs being separated by an obliquely disposed integral web, in combination with blades pivoted between the ears at the ends of the handle and having arcuate lugs or extensions that normally project beyond the ends of the handle when the blades are folded within the kerfs and engage the shoulders or solid portions at the ends of the integral web when the blades are extended.

In testimony whereof, I affix my signature in presence of two witnesses.

PETER GORUT.

Witnesses:
 AUGUST LENZ,
 J. C. PULLMAN.